United States Patent [19]
Oishi

[11] Patent Number: 5,937,156
[45] Date of Patent: *Aug. 10, 1999

[54] ERROR CORRECTION IN DATA REPRODUCTION

[75] Inventor: Akihiro Oishi, Kunitachi, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/524,210

[22] Filed: Sep. 6, 1995

[30]     Foreign Application Priority Data

Sep. 16, 1994 [JP] Japan .................................. 6-221753

[51] Int. Cl.⁶ .................................................. G06F 11/00
[52] U.S. Cl. ...................................................... 395/185.07
[58] Field of Search ......................... 395/185.07, 185.01, 395/182.04; 371/31, 48; 364/737, 265, 943.9, 964, 970; 360/48; 348/446; 386/112

[56]           References Cited

U.S. PATENT DOCUMENTS

| | | | |
|---|---|---|---|
| 4,637,023 | 1/1987 | Lounsbury et al. | 371/38 |
| 4,639,920 | 1/1987 | Kaneko | 371/31 |
| 4,716,565 | 12/1987 | Suma | 371/31 |
| 4,792,953 | 12/1988 | Pasdera et al. | 371/31 |
| 4,905,099 | 2/1990 | Mester et al. | 360/10.1 |
| 5,142,537 | 8/1992 | Kutner et al. | 371/31 |
| 5,243,428 | 9/1993 | Challapali et al. | 358/167 |
| 5,313,471 | 5/1994 | Otaka et al. | 371/31 |
| 5,341,250 | 8/1994 | Uchida et al. | 360/48 |
| 5,365,380 | 11/1994 | Tanaka | 360/10.3 |
| 5,404,248 | 4/1995 | Shimoda et al. | 360/48 |
| 5,546,409 | 8/1996 | Karasawa | 371/37.4 |
| 5,561,532 | 10/1996 | Ohnishi et al. | 386/47 |
| 5,583,654 | 12/1996 | Oguro | 386/96 |
| 5,587,803 | 12/1996 | Inoue et al. | 386/33 |

*Primary Examiner*—Robert W. Beausoliel, Jr.
*Assistant Examiner*—Stephen C. Elmore
*Attorney, Agent, or Firm*—Fitzpatrick, Cella, Harper & Scinto

[57]           ABSTRACT

When input data is written into or read out from a plurality of memories, operations of the plurality of memories are controlled in a manner such that, as for data which is read out from a predetermined memory among a plurality of memories each of which can store the input data, the data stored in the other memory is set to the read data from the predetermined memory. By virtue of this construction, even when the read data is uncorrectable data, the data with a higher correlation can be read out and a reproduction signal of a higher quality can be obtained.

23 Claims, 5 Drawing Sheets

ERROR CORRECTION IN DATA REPRODUCTION

BACKGROUND OF THE INVENTION

1. Field of the Invention

The present invention relates to a data processing apparatus and, more particularly, to control of writing and reading operations of reproduction data to/from a memory.

2. Related Background Art

Hitherto, a digital video tape recorder (VTR) such that an image signal is digitized, compressed and encoded, and recorded or reproduced to/from a tape has been known.

In such a digital VTR, errors of the digital signal reproduced from the tape are corrected by using parity data added at the time of the recording and an expanding and decoding process which is opposite to the process upon recording is performed, thereby obtaining a reproduction image signal.

Figure 1:
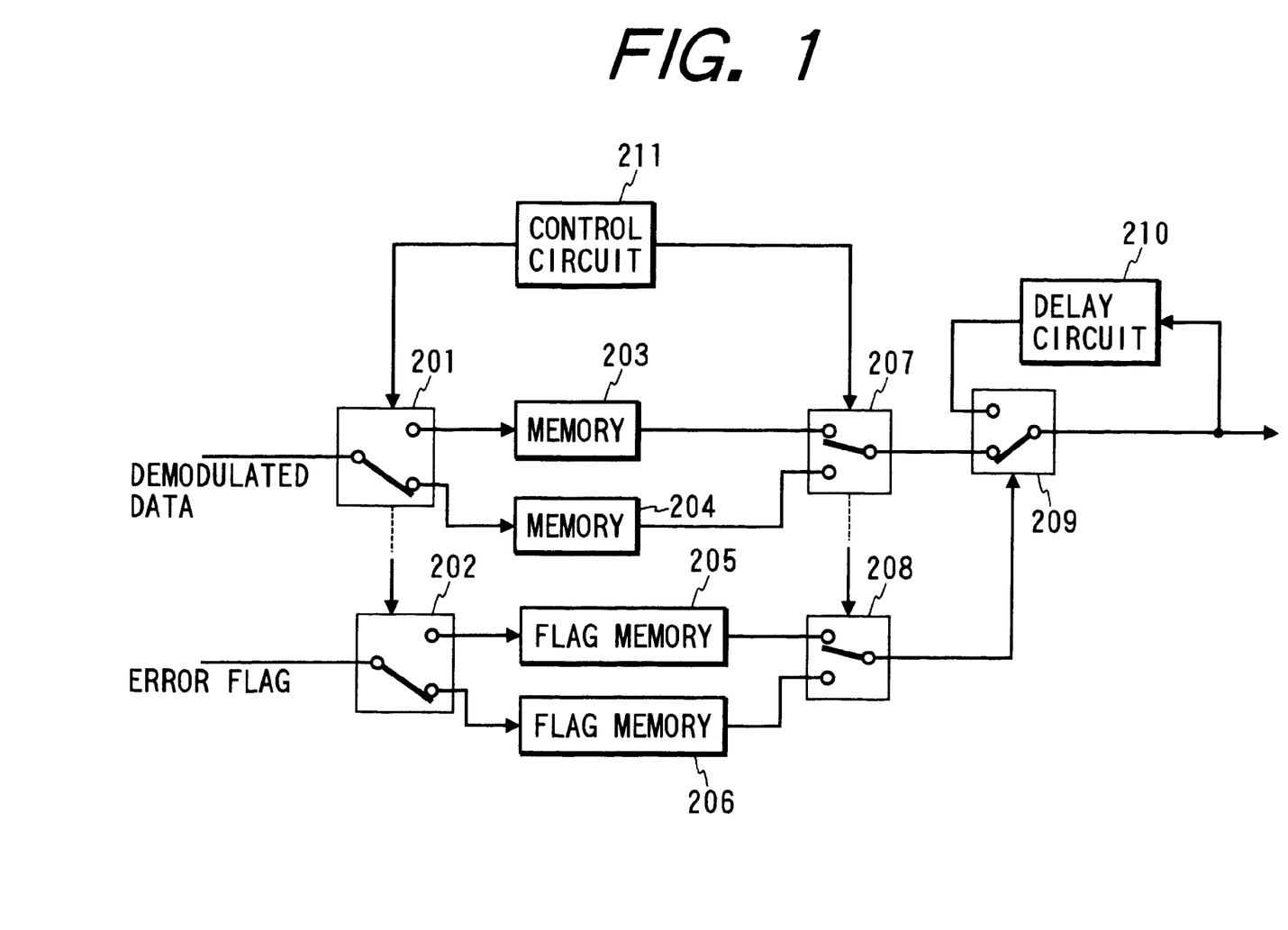
FIG. 1 is a diagram showing a construction of a conventional interpolation circuit.

With respect to data whose errors cannot be corrected (error uncorrectable data), by performing what is called an interpolating process to replace such error uncorrectable data by correctly reproduced data before and after the erroneous data, a deterioration of a reproduction image is prevented. FIG. 1 is a block diagram showing a constructional example of such an interpolation circuit.

In FIG. 1, image data subjected to an error correcting process is inputted to a switch 201 and is stored into memories 203 and 204 each having a capacity of one frame through the switch 201. An error flag indicating that input data is the error uncorrectable data is inputted to a switch 202 and is alternately stored into flag memories 205 and 206 by every amount of one frame through the switch 202. Each of the flag memories 205 and 206 can store error flags of one frame.

In the digital VTR, a shuffling process is executed in which the image data, reproduced in accordance with the order of a raster scan, is read out on a frame unit basis in accordance with the order (different from the reproducing order) of a decoding process executed at the post stage. Since the order of the data which is written into each memory and the order of the data which is read out differ, one memory for each frame is necessary, namely, total two memories are needed.

The image data stored in the memories 203 and 204 is alternately read out through a switch 207 and is outputted to a delay circuit 210 and a circuit at the post stage through a switch 209.

A control circuit 211 controls (the switches 201 and 202) and (the switch 207 and a switch 208), thereby controlling writing and reading operations to/from the memories.

The error flags read out from the flag memories 205 and 206 are outputted to the switch 209 through the switch 208. When the read data is judged to be error data on the basis of the error flags, the switch 209 is connected to the delay circuit 210 side. In the other cases, the switch 209 is connected to the switch 207 side.

The delay circuit 210 delays output data of the switch 209 by a time of one frame and outputs the delayed data to the switch 209. By constructing as mentioned above, an interframe interpolation is accepted to interpolate the uncorrectable data by the data of a frame preceding to the frame of the uncorrectable data by one frame, so that a deterioration in picture quality of the reproduction image can be prevented.

In the conventional apparatus as mentioned above, however, the memory for interpolation of one frame is needed in addition to the data memory for shuffling the reproduction image data. Consequently, there is a problem in that the memory capacity of the whole circuit increases.

SUMMARY OF THE INVENTION

An object of the present invention is to solve the above-mentioned problems.

Another object of the invention is to provide an apparatus in which a memory capacity can be reduced and a picture quality of a reproduction signal hardly deteriorates.

According to an embodiment of the invention, in order to accomplish such objects, there is provided a data processing apparatus comprising a plurality of memory means each for storing input data, and memory control means for controlling reading operations of the plurality of memory means in a manner such that, as for the data that is read out from predetermined memory means among the plurality of memory means, the data read out from the other memory means is outputted as read data from the predetermined memory means.

The above and other objects and features of the present invention will become apparent from the following detailed description and the appended claims with reference to the accompanying drawings.

DETAILED DESCRIPTION OF THE PREFERRED EMBODIMENTS

An embodiment of the invention will now be described in detail hereinbelow with reference to the drawings.

Figure 2:
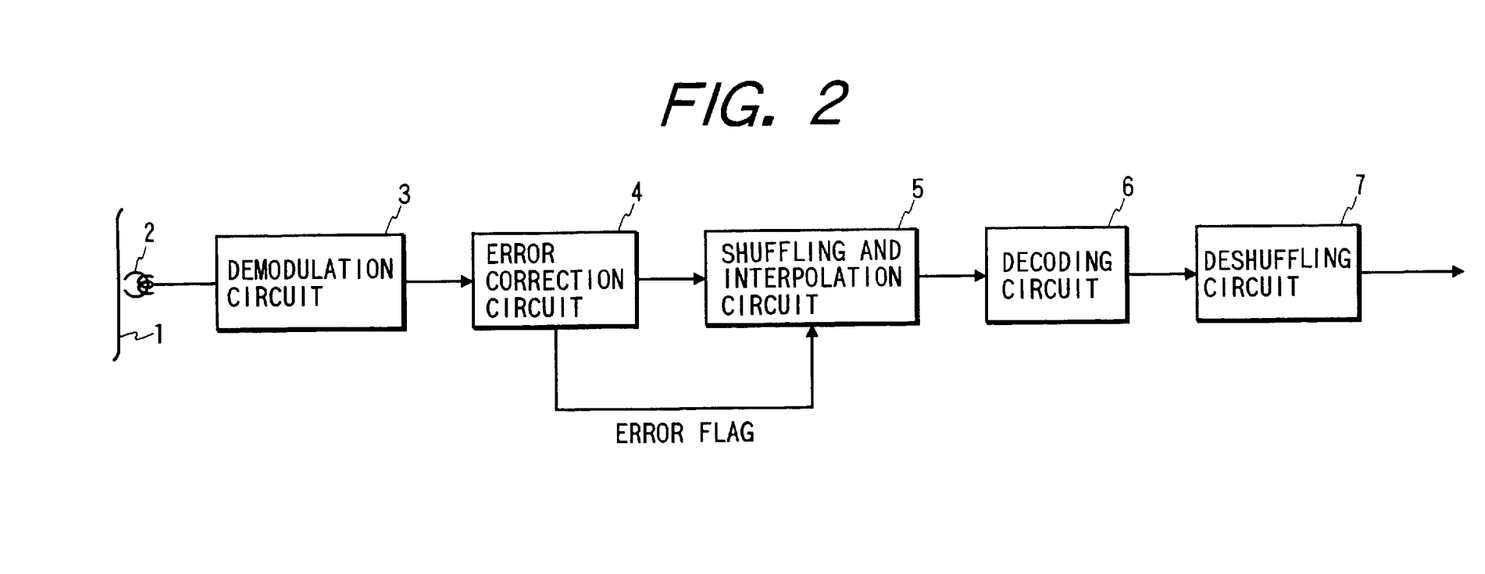
FIG. 2 is a block diagram showing a construction of a digital VTR as an embodiment of the invention.

In the embodiment, a case of applying the invention to a digital VTR will be described. FIG. 2 is a block diagram showing a construction of a reproducing system in the digital VTR according to the invention.

In FIG. 2, digital data including image data, audio data, and subcode data is reproduced from a magnetic tape 1 by a head 2 and is outputted to a demodulation circuit 3. The demodulation circuit 3 demodulates the reproduced data, converts to the data in a format suitable for processes at the post stage, and outputs the converted data to an error correction circuit 4. The error correction circuit 4 corrects errors in the reproduction data by using parity data added at the time of a recording on a unit basis of a block comprising image data of a plurality of pixels and outputs the error corrected data to a shuffling and interpolation circuit 5. The error correction circuit 4 outputs an error flag for uncorrectable data.

The shuffling and interpolation circuit 5 changes the order of the reproduction data as will be explained below and outputs the data and executes an interpolating process on the uncorrectable data and outputs the resultant data to a decoding circuit 6. The decoding circuit 6 expands an information amount by performing an expanding and decoding process in correspondence to the process which was executed at the time of the recording and outputs the expanded data to a deshuffling circuit 7. The deshuffling circuit 7 rearranges the order of the decoded data to the order according to the raster scan and outputs the rearranged data.

The shuffling and interpolation circuit 5 in FIG. 2 will now be described.

Figure 3:
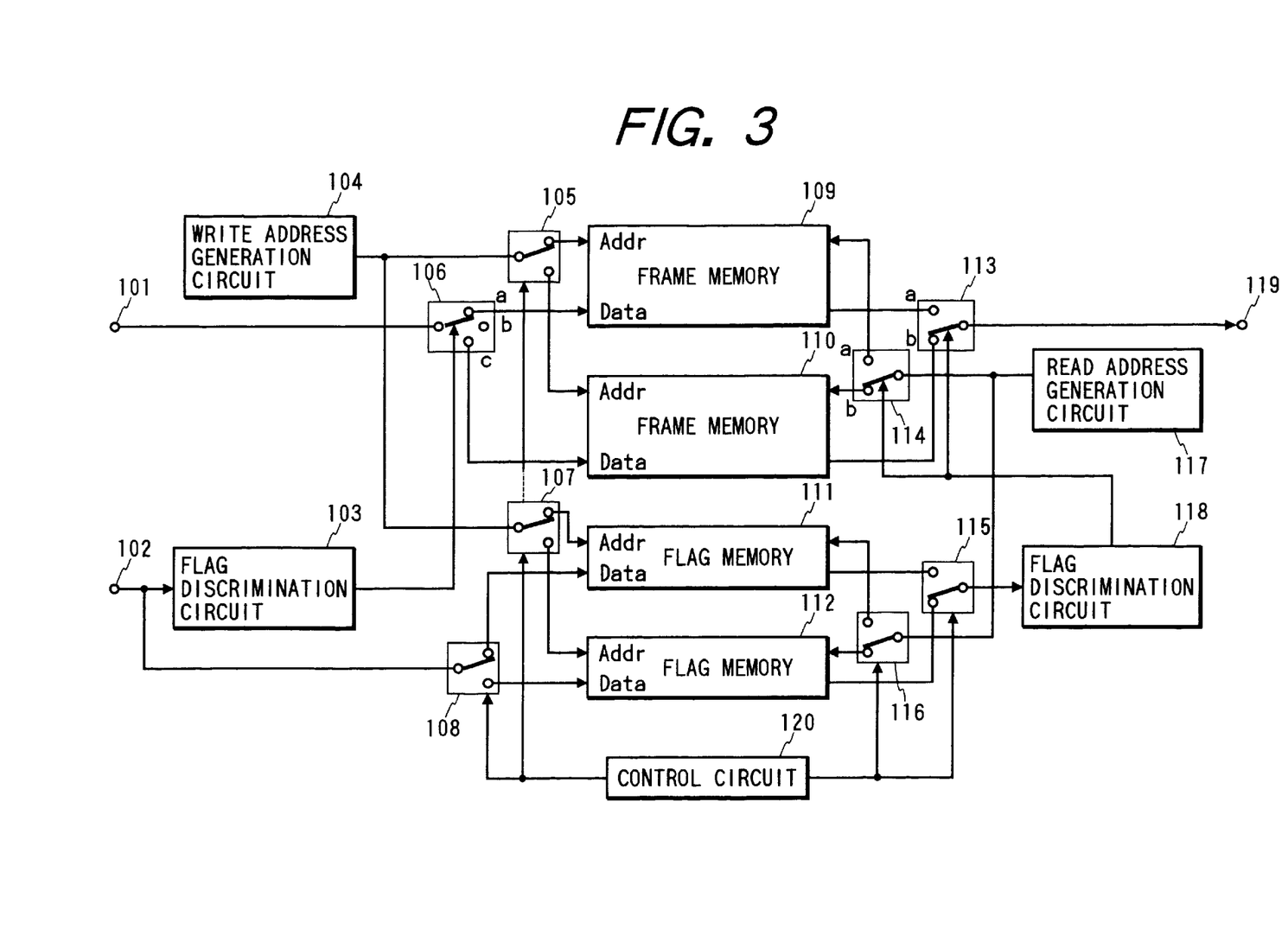
FIG. 3 is a block diagram showing a constructional example of a shuffling and interpolation circuit in FIG. 2.

FIG. 3 is a block diagram showing a construction of the shuffling and interpolation circuit 5. In the embodiment, a case where two memories each having a capacity of one frame are provided and the reproduced image data is alternately written into and read out from the memories will be described. FIG. 3 shows a case where memories 109 and 111 are in a writing state and memories 110 and 112 are in a reading state.

In FIG. 3, the image data which was subjected to the error correcting process is inputted from a terminal 101 and the error flag from the error correction circuit 4 is inputted to a terminal 102. The image data inputted from the terminal 101 is outputted to the memories 109 and 110 through a switch 106 and is written into an address generated from a write address generation circuit 104 in each memory.

The error flags inputted from the terminal 102 are outputted to a flag discrimination circuit 103 and are also outputted to the flag memories 111 and 112 through a switch 108.

Each of the flag memories 111 and 112 can store error flags of one frame. The error flags are alternately stored every frame into the address generated from the address generation circuit 104 through the switch 108 that is controlled by a control circuit 120.

The flag discrimination circuit 103 is a circuit for switching the switch 106 on the basis of the input error flag and alternately switches to terminals (a) and (c) every frame when no error flag for the input data is detected.

When an error flag is detected, since this means that the data which is inputted from the terminal 101 is the uncorrectable data, the switch 106 is switched so as to be connected to the terminal (b), thereby prohibiting the writing of the image data to the memories 109 and 110. Therefore, the image data at the same position on a picture plane which is two-frames preceding to the image data that is at present being inputted has been stored as it is in the address in which no data is written due to the error flag in the memory which is in the writing state.

As mentioned above, on the writing side, it is controlled not to write the uncorrectable data into the memory but to write only data which is correctly reproduced by changing the switch 106 on the basis of the error flag.

Processes on the reading side will now be described.

As mentioned above, the image data and error flags of one frame are stored in each of the memories 109 and 110 and flag memories 111 and 112, respectively. In the embodiment, since the memory 110 and flag memory 112 are in the reading state, the image data and error flag in the addresses generated from a read address generation circuit 117 are read out, respectively. The read image data is outputted through a switch 113.

The error flag read out from the flag memory 112 is outputted to a flag discrimination circuit 118 through a switch 115. The flag discrimination circuit 118 switches the switch 113 and a switch 114 on the basis of the input error flag in a manner similar to the flag discrimination circuit 103.

That is, when no error flag is read out from the flag memory 112, each of the switches 113 and 114 is connected to the (b) terminal and the image data stored in the address generated from the read address generation circuit 117 is read out from the memory 110.

When the error flag read out from the flag memory 112 is detected, on the contrary, each of the switches 113 and 114 is switched and is connected to the (a) terminal and the image data stored in the memory 109 as a memory on the writing side is read out and outputted.

As mentioned above, the reading and writing operations of the two memories 109 and 110 are alternately executed on the frame unit basis in the embodiment. Since the memory 109 is now in the writing state, the image data that is one-frame subsequent to the image data stored in the memory 110 in the reading state is written. The image data that is one-frame preceding to the image data stored in the memory 110 is stored as data in the address in which the present input data is not written in the memory 109.

Therefore, by reading out the data in the memory 109 when the image data is read out from the memory 110, either one of the one-frame preceding or subsequent data is outputted. Since the data which is preceding or subsequent to the uncorrectable data by one frame is outputted as mentioned above in the embodiment, the uncorrectable data is interpolated by the image data before or after the uncorrectable data by one frame. However, since a time difference between the preceding data and the data presently read out from the memory 110 and a time difference between the subsequent data and such a present read-out data are equal, even if any one of the preceding data and the subsequent data is read out, influences on the reproduction image are not so different.

The data read out as mentioned above is outputted to the decoding circuit 6 at the post stage through an output terminal 119.

As mentioned above, in the embodiment, since the error flags are detected when the data is written and read out and the interpolation is executed by controlling the writing and reading operations of the data in accordance with the detection outputs, the memories for the interframe interpolation can be reduced and the interframe interpolation similar to the conventional one can be performed and a deterioration in the reproduction picture quality can be prevented.

Although the flag discrimination circuits are provided on both of the writing and reading sides and both of the writing and reading operations of data are controlled in the foregoing embodiment, the flag discrimination circuit can be also provided only on the writing side.

Since the data is alternately read out every frame on the reading side in this case, the data corresponding to the uncorrectable data is the data which is preceding to the error data by two frames and the uncorrectable data is interpolated by the data with a correlation lower than that of the data of the preceding frame by one frame, used in the foregoing embodiment.

As mentioned above, although not only the image data but also the audio data and subcode data are inputted to the shuffling and interpolation circuit 5 and the shuffling process is performed on all of those data, the description has been made with respect to the image data in the embodiment for simplicity of explanation.

Figure 4:
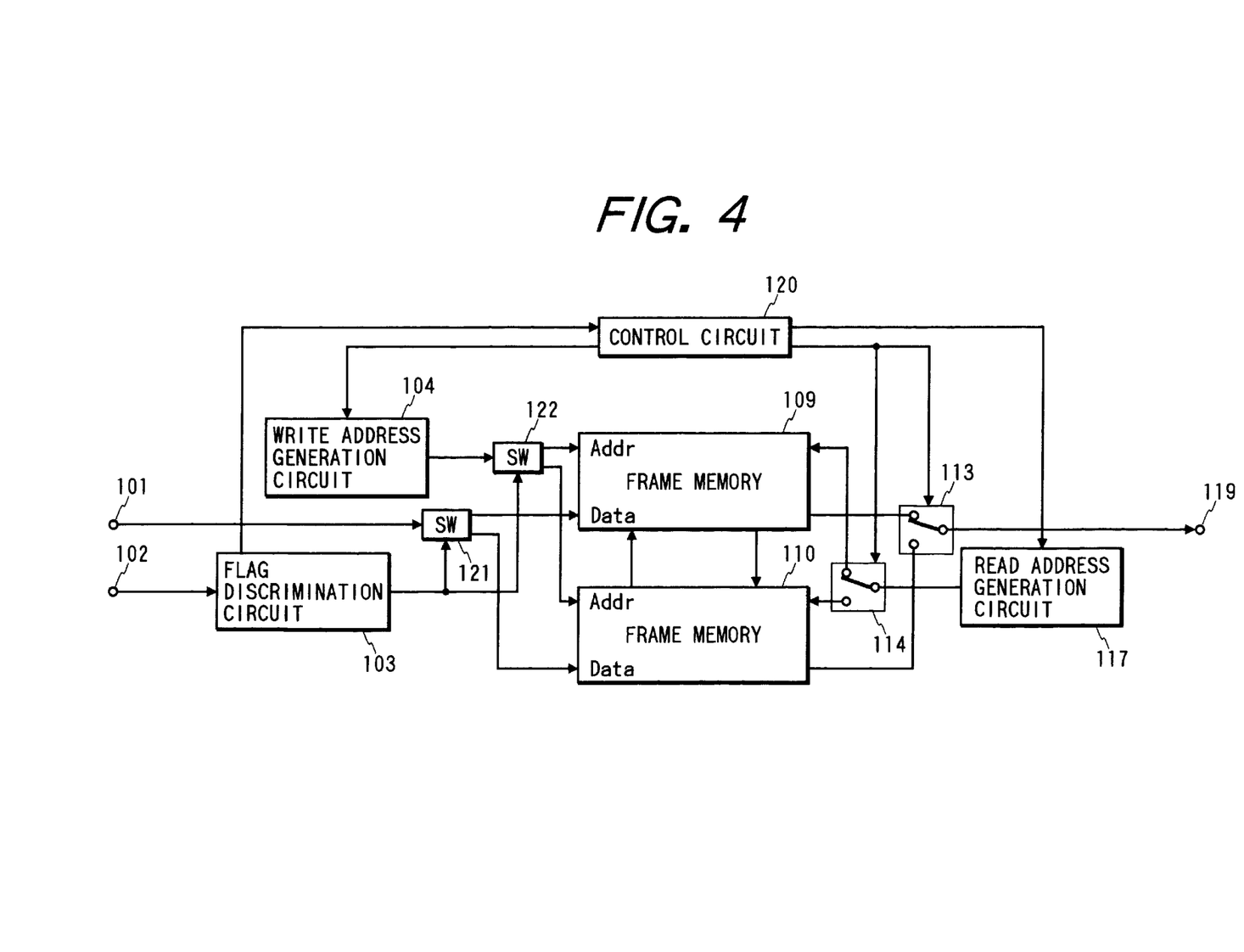
FIG. 4 is a block diagram showing another construction of the shuffling and interpolation circuit in FIG. 2.

The second embodiment of the invention will now be described. FIG. 4 is a block diagram showing a construction of a shuffling and interpolation circuit as a second embodiment. Component elements similar to those in the foregoing embodiment are designated by the same reference numerals and their detailed descriptions are omitted here. It is assumed in the embodiment that the memory 109 is in the reading state and the memory 110 is in the writing state.

In FIG. 4, the reproduction image data is outputted to the memories 109 and 110 through a switch 121 and the error flag is outputted to the flag discrimination circuit 103.

As mentioned above, the flag discrimination circuit 103 is a circuit for judging whether the input data is uncorrectable data or not on the basis of the error flag, thereby controlling the switch 121 and a switch 122.

Figure 5:
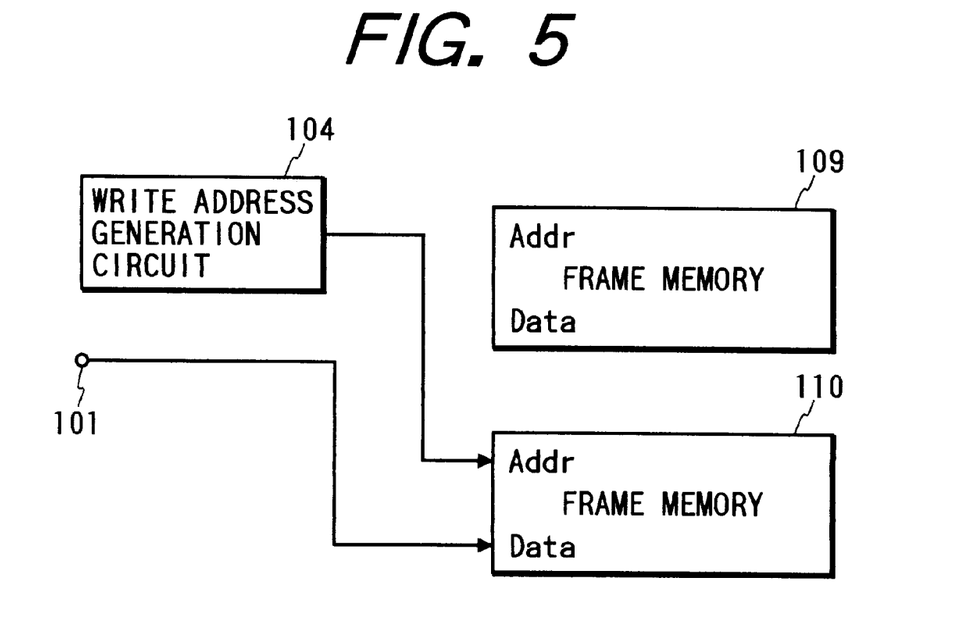
FIG. 5 is a diagram for explaining the operation of a circuit shown in FIG. 2.

When it is judged that there is no error in the input data, the switches 121 and 122 are controlled and the input data is stored into the address in the memory 110 generated from the write address generation circuit 104. Such a state is shown in FIG. 5.

When it is judged that the input data is the uncorrectable data, on the contrary, since the data inputted to the terminal 101 is uncorrectable data, it is necessary to interpolate uncorrectable data without writing uncorrectable data into the memory 110. In this instance, the data which is preceding to the input data by one frame has already been stored in the memory 109 and the data at the same position on the screen has been stored in the same address in each memory.

Figure 6:
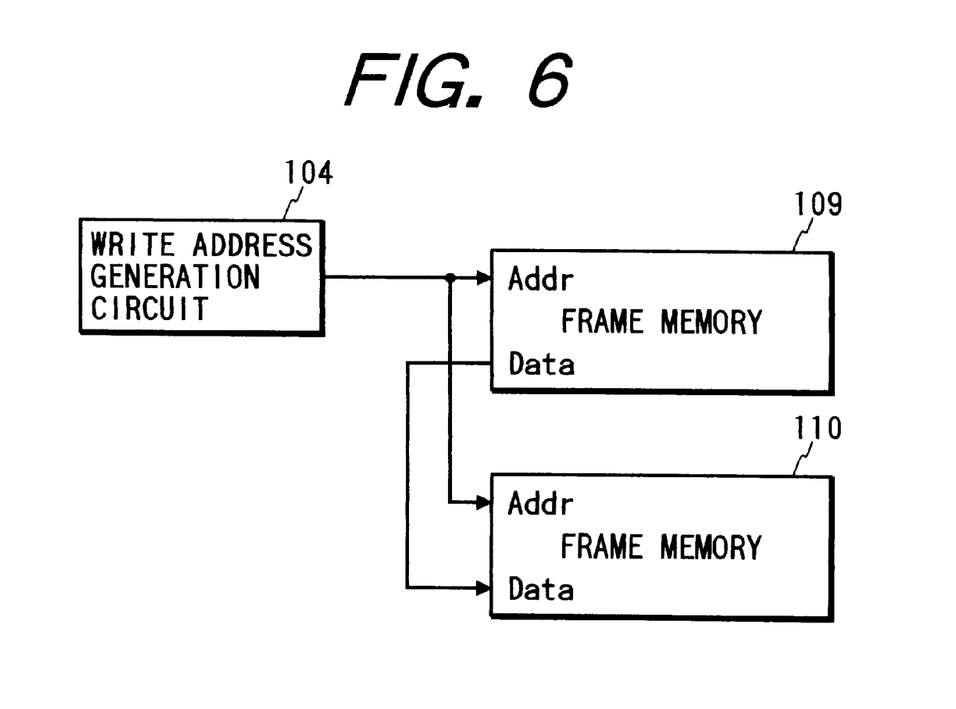
FIG. 6 is a diagram for explaining the operation of the circuit shown in FIG. 2.

When it is judged that the input data is uncorrectable data, consequently, the flag discrimination circuit 103 controls the switch 122 so as to output the same write address to both of the memories 109 and 110. The flag discrimination circuit 103 controls the switch 121 and also outputs a signal indicative of uncorrectable data to the control circuit 120. The control circuit 120 controls the memories so as to read out the data in the address designated by the write address generation circuit 104, namely, the address in which uncorrectable data is to be written in the memory 109 and to output and store the read data into the memory 110. Such a state is shown in FIG. 6.

In the reading mode, the switches 113 and 114 are switched every frame and the data is alternately read out from the memories.

In the embodiment as mentioned above, when the data is written, the uncorrectable data is detected on the basis of the error flag, the data at the corresponding position is read out from the memory in which the data has already been written, and the read data is written in place of the uncorrectable data, thereby interpolating the uncorrectable data. Therefore, the deterioration in the reproduction picture quality can be prevented while further reducing the flag memories as compared with the foregoing embodiment.

Although the case of interpolating the image data on the frame unit basis has been described in the foregoing embodiment, the error correction is generally executed on a unit basis of a block comprising the image data of a plurality of samples in the digital VTR. The interpolation of data is also consequently often performed on the block unit basis. The invention can be also applied to such a case.

Although the case of performing the writing and reading operations of the data and the interpolation on the frame unit basis by using the frame memories has been described in the foregoing embodiment, the invention is not limited to such a case but the writing and reading operations of the data and the interpolation can be also executed every unit of another period such as a field or the like.

Further, although the two memories have separately been provided in the above-mentioned embodiment, what is called a dual-port memory such that one memory is divided into a plurality of areas and the writing and reading operations can be independently executed in each area can be also used. Three or more memories can be also used.

As will be understood from the above description, in the foregoing embodiment, in response to the detection of the uncorrectable data in the reproduction data, the data read out from the predetermined memory is replaced by the data read out from another memory and the replaced data is outputted Therefore, the interpolation of the uncorrectable data can be executed without especially providing delaying means.

Thus, the memories can be reduced and also the deterioration in the reproduction picture quality can be prevented.

What is claimed is:

1. A data processing apparatus, comprising:
   (a) input means for inputting image data;
   (b) a plurality of memory means each for storing the image data of one picture; and
   (c) memory control means for selectively writing the image data input from said input means into the plurality of memory means and for selectively reading out the image data from the plurality of memory means,
   said memory control means being structured and arranged to control reading operations of a particular one memory means of said plurality of memory means, which one memory means is in a reading state, in a manner such that the image data stored in other memory means of said plurality of memory means is read out instead of reading the image data from said particular one memory means.

2. An apparatus according to claim 1, further comprising error correction means for correcting error data in the input image data and generating error information indicating uncorrectable error data which cannot be corrected by said error correction means,
   wherein said memory control means controls writing and reading operation of said plurality of memory means in accordance with the error information generated by said correction means.

3. An apparatus according to claim 2, wherein said memory control means further comprises:
   an error memory for storing the error information generated by said error correction means; and
   selecting means for selectively reading out the image data from said plurality of memory means in accordance with the error information stored in said error memory.

4. An apparatus according to claim 2, further comprising reproducing means for reproducing image data and outputting the reproduced image data as the input image data.

5. An apparatus according to claim 4, wherein said error correction means detects the uncorrectable error data on a unit basis of a block comprising the reproduced image data of a plurality of samples, and
   said memory control means controls the reading operation of the image data from the plurality of memory means on the unit basis of a block.

6. An apparatus according to claim 2, wherein said memory control means further controls the writing operation of the input image data for said plurality of memory means in accordance with the output of said error correction means.

7. An apparatus according to claim 1, wherein said memory control means controls said memory means in a manner such that, as for the image data read out from a predetermined position in said predetermined memory means, the image data read out from said predetermined position in said other memory means is outputted as read data from said predetermined memory means.

8. An apparatus according to claim 1, wherein an order of the image data which is written into said plurality of memory means and an order of the image data which is read out from said plurality of memory means differ from each other.

9. A data processing apparatus comprising:
   (a) input means for inputting input data;
   (b) a plurality of memory means each for storing the input data; and
   (c) memory control means for selectively writing the input data from said input means into said plurality of memory means and for controlling said plurality of memory means in a manner such that, when the input data from said input means is written into a particular one memory means of said plurality of memory means, the data stored in other memory means of said plurality of memory means is read out and written into said particular one memory means instead of the input data from said input means which would otherwise be written into said particular one memory means.

10. An apparatus according to claim 9, further comprising error detecting means for detecting erroneous data in the input data,
    wherein said memory control means executes a controlling operation of said plurality of memory means in accordance with an output of said error detecting means.

11. An apparatus according to claim 10, further comprising reproducing means for reproducing image data and for outputting the reproduced image data as the input data.

12. An apparatus according to claim 10, wherein said error detecting means detects the erroneous data on a unit basis of a block comprising image data of a plurality of samples, and
    said memory control means controls a reading operation of the image data from said plurality of memory means on said unit basis of a block.

13. An apparatus according to claim 10, further comprising processing means for performing a predetermined process on the data read out from said plurality of memory means,
    wherein the reproduction image data is written into said plurality of memory means in an order according to a raster scan, and is read out in an order suitable for said predetermined process.

14. An apparatus according to claim 9, wherein said memory control means controls said plurality of memory means in a manner such that, as data to be written at a predetermined position in said predetermined memory means, the data read out from said predetermined position in said other memory means is set to the data that is written into said predetermined memory means.

15. An apparatus according to claim 9, wherein an order of the input data which is written into said plurality of memory means and an order of the data which is read out from said plurality of memories means differ from each other.

16. A data processing method which can be applied to an apparatus for executing selectively writing and reading operations of input data to a plurality of memory means, wherein operations of the plurality of memory means are controlled in a manner such that, when the input data is read out from a particular one memory means of the plurality of memory means each of which can store the input data, the data stored in other memory means of the plurality of memory means is read out instead of reading the image data from the particular one memory means.

17. A method according to claim 16, wherein error data in the input data is detected and a control operation of the memory means is executed in accordance with the detection result.

18. A method according to claim 16, wherein the error data in the input data is detected and the outputting of the data read out from the predetermined memory means is prohibited in accordance with the error detection result.

19. A method according to claim 16, wherein an order of the input data which is written into the plurality of memory means and an order of the input data which is read out from the plurality of memory means differ from each other.

20. A reproducing apparatus, comprising:
    reproducing means for reproducing image data;
    error correction means for correcting error data in the reproduced image data and for generating error information indicating uncorrectable error data which cannot be corrected by said error correction means;
    a plurality of memory means each for storing the image data of one frame from said error correction means; and
    memory control means for selectively writing the image data from said error correction means into said plurality of memory means and for selectively reading out the image data from said plurality of memory means,
    said memory control means controlling a reading operation of a particular one memory means of said plurality of memory means, which particular one memory means is in a reading state, according to the error information from said error correction means in a manner such that the image data stored in other memory means of said plurality of memory means is read out instead of reading the image data from particular one memory means.

21. An apparatus according to claim 20, wherein said memory control means inhibits reading out of the uncorrectable error data from the predetermined memory means, according to the error information, and reads out the image data from the other memory means instead of the uncorrectable error data stored in the predetermined memory means.

22. An apparatus according to claim 20, wherein an order of the image data to be written into said plurality of memory means differs from an order of the image data read out from said plurality of memory means.

23. An apparatus according to claim 20, wherein said memory control means includes an error memory for storing the error information.

* * * * *

UNITED STATES PATENT AND TRADEMARK OFFICE
CERTIFICATE OF CORRECTION

PATENT NO. : 5,937,156

DATED : August 10, 1999

INVENTOR(S) : Akihiro Oishi

Page 1 of 2

It is certified that error appears in the above-identified patent and that said Letters Patent is hereby corrected as shown below:

COLUMN 1
　Line 30, "the" should be deleted -- and "error" should be deleted;
　Line 61, "accepted" should read --executed--.

COLUMN 4
　Line 46, "both of" (first occurrence) should read --both--;
　Line 46, "both of" (second occurrence) should read --both--.

COLUMN 6
　Line 64, "predetermined" should read --particular--;(2nd occur)
　Line 67, "predetermined" should read --particular--.

COLUMN 7
　Line 31, "10," should read --11,--;
　Line 38, "10," should read --11,--;
　Line 49, "predetermined" should read --particular--;(2nd occur)
　Line 52, "predetermined" should read --particular--;
　Line 56, "memories" should read --memory--.

UNITED STATES PATENT AND TRADEMARK OFFICE
CERTIFICATE OF CORRECTION

PATENT NO. : 5,937,156

DATED : August 10, 1999

INVENTOR(S) : Akihiro Oishi

It is certified that error appears in the above-identified patent and that said Letters Patent is hereby corrected as shown below:

<u>COLUMN 8</u>
   Line 7, "image" should read --input--;
   Line 15, "predetermined" should read --particular--;
   Line 46, "predetermined" should read --particular--;
   Line 49, "predetermined" should read --particular--.

Signed and Sealed this

Fourth Day of April, 2000

Attest:

Q. TODD DICKINSON

*Attesting Officer*      *Director of Patents and Trademarks*